Nov. 26, 1946.  J. C. JAQUES  2,411,623

PORTABLE SAW

Filed July 15, 194  3 Sheets-Sheet 1

John C. Jaques
Inventor

Nov. 26, 1946.  J. C. JAQUES  2,411,623
PORTABLE SAW
Filed July 15, 1944  3 Sheets-Sheet 2
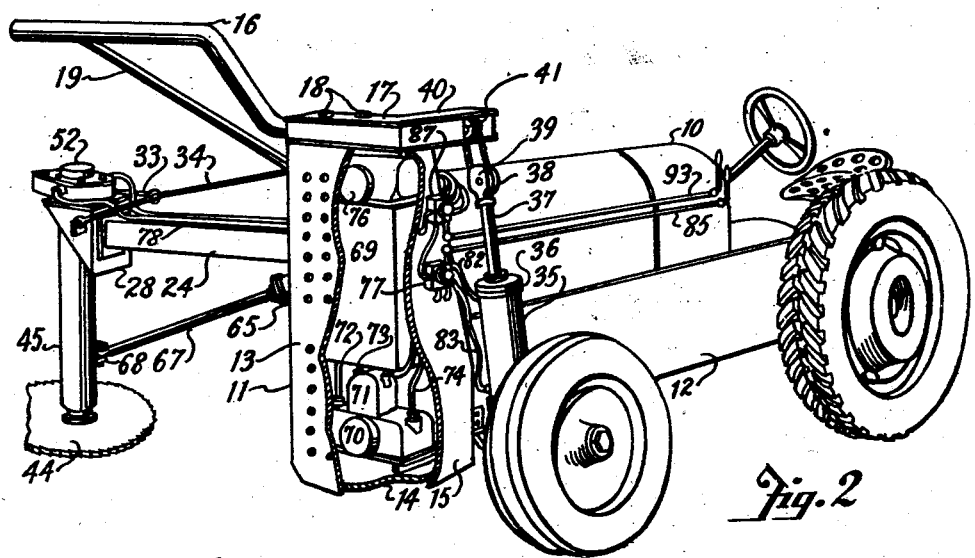
Fig. 2
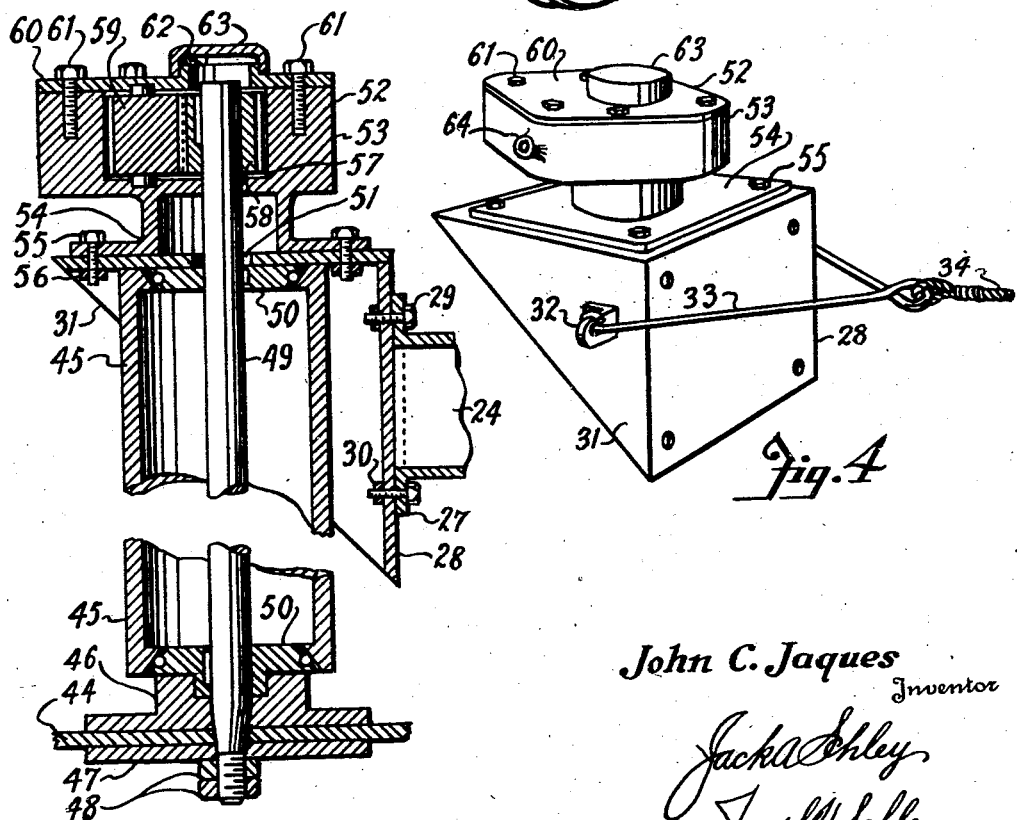
Fig. 3
Fig. 4
John C. Jaques
Inventor

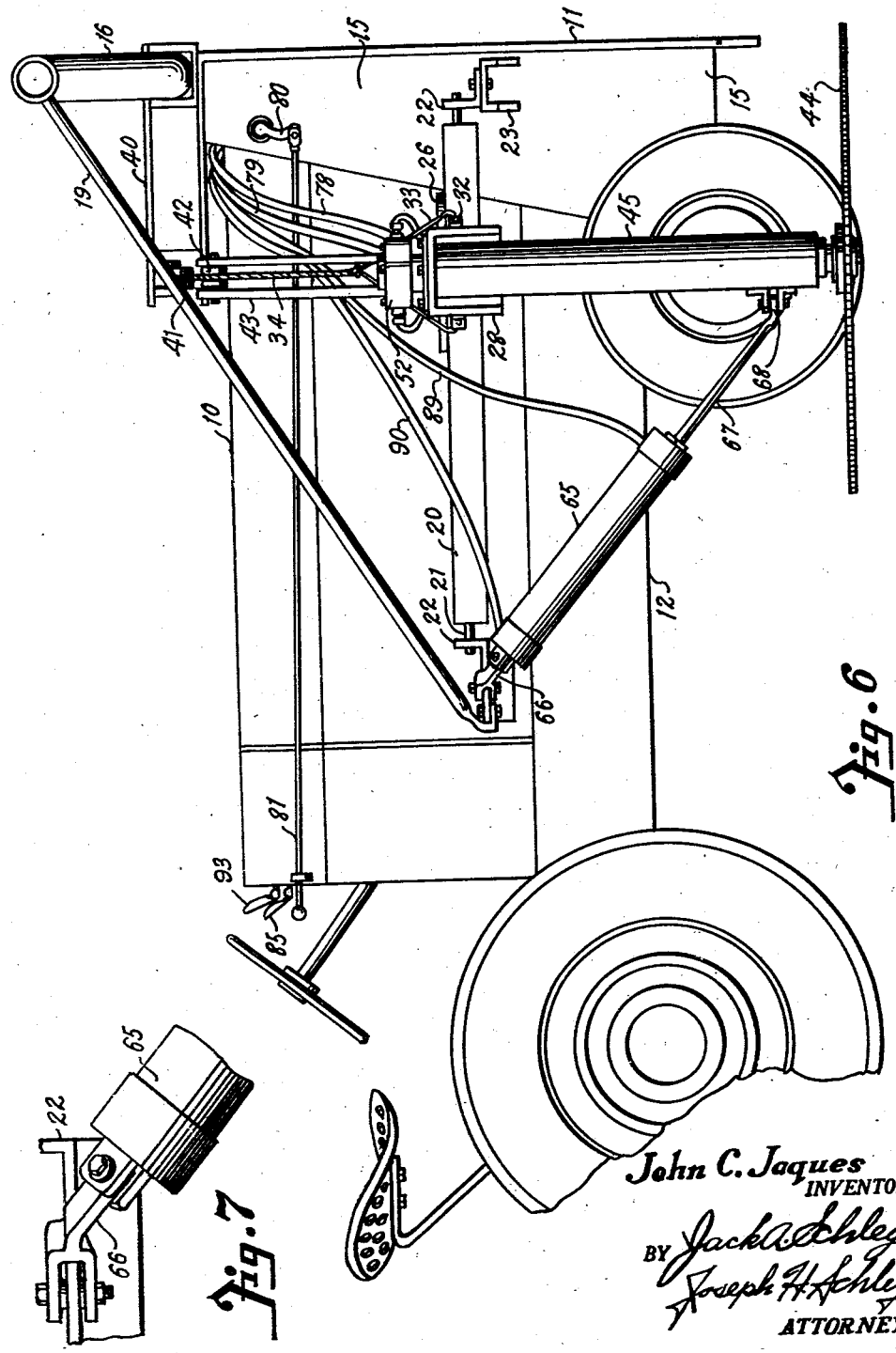

Patented Nov. 26, 1946

2,411,623

UNITED STATES PATENT OFFICE 2,411,623

PORTABLE SAW

John C. Jaques, Denison, Tex.

Application July 15, 1944, Serial No. 545,048

4 Claims. (Cl. 143—43)

This invention relates to new and useful improvements in portable saws.

One object of the invention is to provide an improved portable saw which is of simple rugged construction so as to be particularly adaptable for use in cutting underbrush, tough grass, trees and stumps in the clearing of land as well as being capable of logging timber.

An important object of the invention is to provide an improved portable saw adapted to be mounted upon a vehicle by a universal connection so as to be movable through horizontal and vertical arcs of sufficient amplitude to permit rotation of the saw and cutting by the same at various angles relative to the ground, there being means operable by the operator of the vehicle for swinging and holding said saw in adjusted cutting positions.

A particular object of the invention is to provide an improved saw, of the character described, supported in spaced relation to a vehicle and having fluid-driven means associated with the upper end of its shaft for rotating the same so as to eliminate the necessity of a multiplicity of gears and universal joints and thereby provide a compact arrangement which facilitates manipulation and removal of the saw.

Another object of the invention is to provide an improved portable saw having pressure means, such as a hydraulic fluid, for driving the saw, varying its position and holding the same in adjusted positions whereby said saw may be readily mounted upon a tractor or other vehicle and the actuation thereof controlled by the operator of the vehicle.

A construction designed to carry out the invention will be hereinafter described together with other features of the invention.

Figure 1:
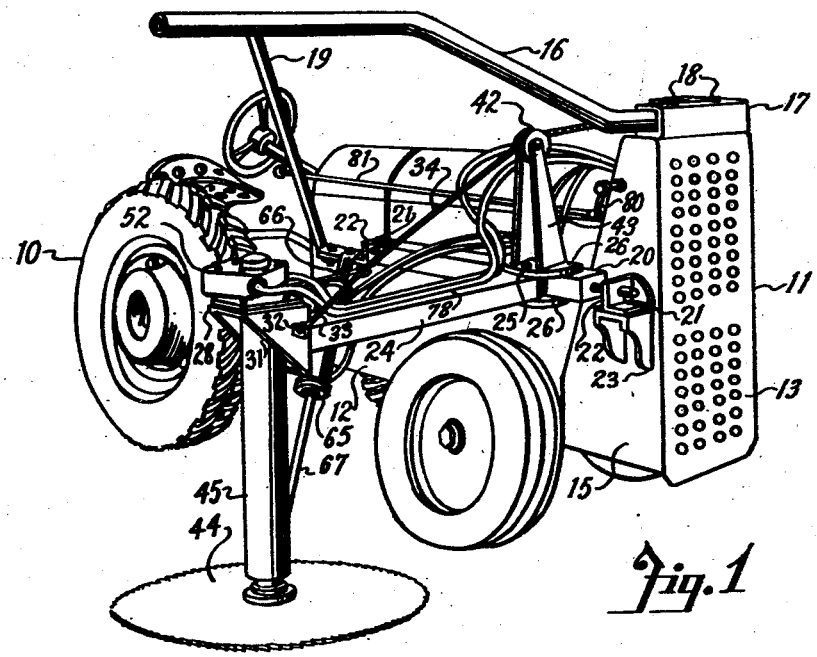
Figure 5:
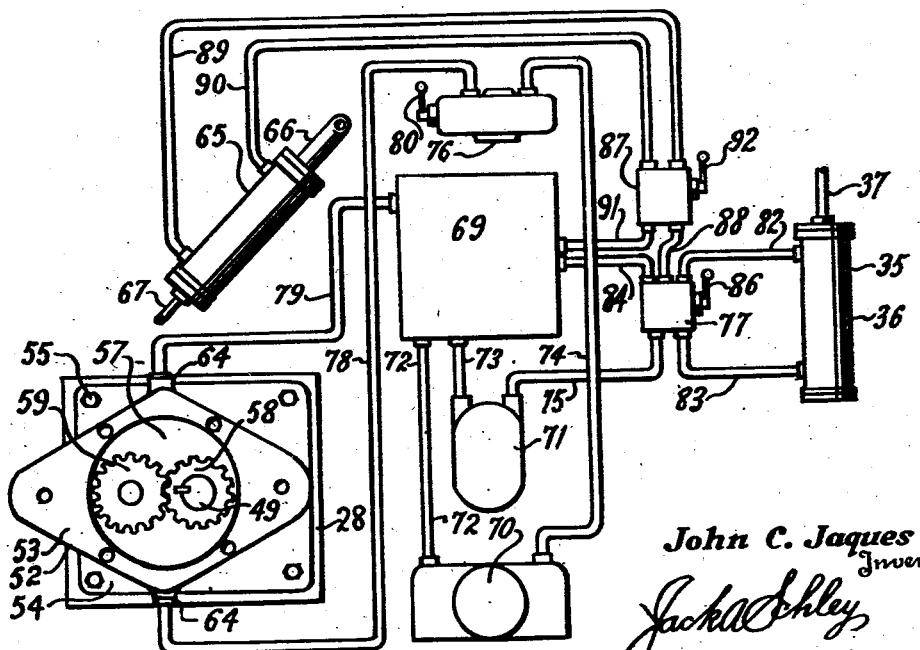

The invention will be more readily understood from a reading of the following specification and by reference to the accompanying drawings, wherein an example of the invention is shown, and wherein:

Fig. 1 is a perspective view of a tractor having a portable saw, constructed in accordance with the invention, mounted thereon, Fig. 2 is a view, similar to Fig. 1, of the saw and the opposite side of the tractor, Fig. 3 is an enlarged, transverse, vertical, sectional view of the saw shaft housing and fluid motor, Fig. 4 is an enlarged view of the supporting bracket of the saw, Fig. 5 is a schematic view of the hydraulic system for actuating the saw, and Fig. 6 is a side elevation of the tractor and the saw, and Fig. 7 is an enlarged, fragmentary view of the mounting for the upper end of the hydraulic actuating cylinder.

In the drawings, the numeral 10 designates a tractor of conventional construction and having an upright housing or casing 11 mounted on the forward end of its frame 12. The housing is substantially rectangular and includes a vertical front grille or perforated plate 13, a bottom 14 and suitable side walls 15. A transverse boom or tree pushing member 16 projects laterally from the upper end of the housing 11 and has its inner end portion secured to the upper end or top thereof by a short channel bar or bracket 17 and suitable bolts 18 which extend through the channel bar and boom. The bracket 17 is angular or substantially L-shaped and is suitably fastened to the upper ends of the side walls 15 to form the top of the housing. For reinforcing the boom 16, a tubular rod or a pipe 19 extends from the outer portion of said boom to the rear of the tractor frame 12. Although not illustrated, the pipe 19 is removably fastened to the boom and tractor frame so as to be readily disconnected therefrom, whereby said boom may be disconnected from the housing upon removal of the bolts 18.

A horizontal member or beam 20 extends longitudinally along one side of the tractor 10 and is journaled by means of axial end pins 21 which extend through angular brackets 22. Spaced supports 23 are secured to the frame 12 and housing side wall 15 for receiving and supporting the brackets 22, whereby the beam 20 is free to rotate upon its longitudinal axis. A lateral element or arm 24, of suitable hollow construction, is pivotally connected by a pin 25 to flat plates or brackets 26 which are secured to the upper and lower surfaces of the beam 20, the pin extending vertically through the plates and arm. Thus, the arm 24 is movable through a horizontal or lateral arc relative to the beam and, due to the rotatable mounting of said beam, may be swung through a vertical arc, whereby said arm may undergo universal movement relative to the tractor. As is clearly shown in Fig. 3, a peripheral flange 27 is formed on the outer end of the arm 24 so as to permit fastening of an angular, saw-supporting bracket 28 to said arm by means of suitable bolts 29 and nuts 30. For reinforcing the horizontal and vertical legs or portions of the bracket, triangular side plates 31 connect said legs. A lug or ear 32 is formed on each plate 31 and has one end of a yoke-shaped bail or hook 33 connected thereto as shown in Fig. 4.

For holding the bracket 28 as well as the arm 24 in vertically-adjusted position, a cable or rope 34 is secured to the bail 33 and extends transversely across and over the top of the tractor to a hydraulic ram 35 which is disposed in a vertical or upright position upon the opposite side of said tractor adjacent its forward axle. This ram is of conventional construction and includes a cylinder 36, suitably fastened to the tractor frame 12, having a piston or plunger (not shown) reciprocally mounted therein with its rod 37 projecting from the upper end thereof. An upright pulley or sheave 38 is rotatably supported by means of a clevis 39 upon the upper end of the piston rod 37 so as to have its horizontal axis perpendicular to the longitudinal axis of said rod and parallel to the longitudinal axis of the tractor frame. The cable 34 is threaded under the pulley 38 and has its free end secured to the rearwardly projecting leg 40 of the bracket 17. A second upright pulley or sheave 41 is carried by the leg 40 and is substantially parallel to the pulley 38 for receiving and supporting the portion of the cable which extends from beneath the said pulley 38 to the bail 33. This portion of the cable is also threaded over and supported by a third sheave or pulley 42 disposed on the right-hand side of the tractor above the beam 20 and being journaled between the upper ends of upright arms or standards 43 which project from the upper pivot plate 26. Due to this arrangement, the arm 24 and bracket 28 may be swung, or raised and lowered, in a vertical arc upon reciprocation of the plunger of the ram 35.

A disk or circular saw 44 is adapted to be supported by the bracket 28 and preferably has its shaft housing 45 secured to and depending from the horizontal portion of said bracket (Fig. 3). The saw disk is clamped between an annular hub 46 and washer 47, by a pair of nuts 48, upon the lower end of a drive shaft 49 which extends axially through the housing 45. For rotatably supporting the shaft 49 within the housing, suitable thrust bearings 50 are mounted in the upper and lower ends of said housing and are keyed or otherwise secured to said shaft. As shown in Fig. 3, the upper end of the drive shaft projects through an opening 51 formed in the bracket 28 and has connection with a fluid-actuated motor 52 which includes a body or casing 53 having its flanged base 54 in axial alinement with the housing 45 and fastened to the upper surface of the bracket 28 by bolts 55 and nuts 56, or other suitable means. A cylindrical chamber or bore 57 is formed in the central portion of the body 53 for receiving a driving gear 58 and an idler gear 59 which have their teeth in constant mesh (Figs. 3 and 5). The driving gear 58 is preferably keyed or otherwise secured to the upper end of the shaft 49, whereby rotation of said gear will impart rotation to the saw 44. A plate 60 closes the upper end of the chamber 57 and is secured to the body 53 by a plurality of bolts 61. If desired, an inspection opening 62 may be provided in the plate 60 above the driving gear 58 and may be closed by a suitable cap 63. For driving the gears 58 and 59, a hydraulic fluid, such as oil, is adapted to be forced under pressure through the chamber 57 by means of diametrically-opposed ports 64 which are in plane intersecting the meshing teeth of said gears. Manifestly, the pressure of this fluid in passing through the chamber 57 will be exerted upon the teeth of the gears so as to cause rotation thereof, which rotation is transmitted through the shaft 49 to the saw 44.

For controlling the horizontal movement of the saw, a ram 65 is pivotally connected by a suitable lug or ear 66 to the rear angular bracket 22 of the beam 20 and the piston or plunger (not shown) of this ram has the outer end of its rod 67 pivotally fastened to the saw shaft housing 45 by a suitable clevis or bracket 68 (Fig. 2). Since the arm 24 is pivotally connected by the pivot pin 25 and plates 26 to the beam 20, said arm and the saw may be swung in a horizontal arc upon reciprocation of the piston rod 67. Also, this pivotal connection, together with the pivotal mounting of the beam, permits tilting of the saw and actuation of the same in a tilted position. The rams 35 and 65 coact in moving the saw to and holding the same in adjusted positions. It is pointed out that, due to the provision of the pulley 38 at the upper end of the piston rod 37, the vertical movement of the saw is substantially twice the length of travel of said rod. By disconnecting the ram 65 and/or removing the bracket 28 from the arm 24, said arm, with or without said bracket and the saw, may be swung rearwardly so as to be disposed contiguous to the beam 20 for shipment of the tractor or passage of the same through narrow openings.

As shown in Fig. 5, the rams 35 and 65 are adapted to be actuated by a suitable hydraulic or pressure fluid system and this actuation is controlled by means of suitable valves. A storage tank or reservoir 69, containing a hydraulic fluid, such as oil, is mounted within the upper portion of the housing 11 and communicates with pumps 70 and 71 therebelow (Fig. 2) by suitable lines 72 and 73, respectively, for supplying the fluid to the intake sides thereof. The fluid is forced under pressure by the pumps 70 and 71 through hose or tubes 74 and 75 to control valves 76 and 77 respectively. The inlet port 64 of the motor body 53 communicates with the valve 76 through a flexible hose or tube 78, while a similar hose 79 connects the other port to the tank 69. Thus, when the valve 76 is in its open position, fluid is drawn from the reservoir through the line 72 and forced by the pump 70 through the tube 74, said valve and hose 78 into and through the chamber 57 of the motor 52 so as to drive the gears 58 and 59 and rotate the saw 44. Upon discharge of the fluid from the motor, the same is returned to the reservoir by the hose 79.

For permitting manual operation of the valve 76 by the operator of the tractor, a lever 80 and rod 81 (Fig. 1) is provided. The valve 77 communicates with the upper and lower ends of the cylinder 36 of the ram 35 through flexible hose or tubes 82 and 83, whereby fluid under pressure may be supplied to and exhausted from said ram for reciprocating the piston rod 37 which raises and lowers the saw, as has been hereinbefore explained. The fluid exhausted from the cylinder 36 passes through the valve 77 and is conducted by a hose or tube 84 to the reservoir 69. Manual operation of this valve by the tractor operator is permitted by means of a rod 85 (Fig. 2) and lever 86. For controlling the actuation of the ram 65, a control valve 87 is disposed above the valve 77 and communicates therewith through a hose or tube 88. Flexible hose or tubes 89 and 90 establish communication between the ends of the ram 65 and the valve 87, while an exhaust hose or tube 91 connects said valve to the reservoir. A lever 92 and rod 93 (Fig. 2) permits the tractor operator to manually operate the valve 87. Manifestly, reciprocation of the piston rod 67 may be controlled by means of the valve 87 so as to horizontally adjust and hold the saw in horizontally-adjusted positions. It is pointed out that the valve 87 is in constant communication with the discharge side of the pump 71 due to the short tube 88 which, in effect, forms a continuation of the hose 75 and which is in constant communication therewith.

As has been set forth hereinbefore, a tractor, having a saw of the character described mounted thereon, may be readily placed in condition for shipment or travel through narrow or constricted passages. The boom 16 and its reinforcing pipe 19 may be removed, while the ram 65 and its rods 67 may be disconnected to permit rearward swinging of the arm 24 and the saw to a position contiguous to the beam 20. For the purposes of repair or replacement, the bracket 28 may be readily disconnected from the arm 24. Manifestly, the saw is readily portable and is of efficient, economical and rugged construction whereby the same may be mounted upon any vehicle or tractor. The saw may be used in a fixed position or may be swung in horizontal and vertical arcs, being movable toward the work by the tractor operator while in operation. As has been explained, the ram 35 controls the vertical position of the saw and said ram is actuated through the valve 77, rod 85 and lever 86. The horizontal position of the saw is controlled by the ram 65 through the valve 87, lever 92 and rod 93. Although the horizontal and vertical movements of the saw are independent of each other, the same necessarily coact and tend to limit each other.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A mobile power saw including a laterally extending arm having means for mounting it on the side of a tractor pivotally about a horizontal axis alongside the tractor and swingably about an axis in a plane normal to the pivotal axis, an upright support depending from the outer end of said arm, an upright rotatable shaft mounted in said support, a circular saw mounted on the lower end of said shaft below said support, a hydraulic cylinder having means for pivotally mounting it on the side of a tractor laterally remote from the arm, a piston in the cylinder and having a rod extending from the cylinder and pivoted to the lower end of said support, said cylinder and piston and rod constituting means for bracing the support and saw and for swinging the same in a substantially horizontal plane into and out of the work, a hydraulic motor mounted on the outer end of the arm connected to the upper end of the shaft, and means for supporting said arm against downward movement.

2. A mobile saw as set forth in claim 1, and a push bar carried by the tractor and extending laterally thereof above the saw.

3. The combination with a mobile power saw including, a self-propelled vehicle, a saw support pivotally supported on the vehicle for swinging vertically and having an outwardly directed member pivoted to swing laterally, a shaft housing carried by the outwardly directed member and extending downwardly therefrom, a saw shaft mounted in said housing, a circular saw attached to the lower end of said shaft, means for adjustably supporting the outwardly directed member against downward swinging, fluid-actuated means connected to said supporting means for adjusting the latter, and a second fluid-actuated means for swinging the outwardly extending member laterally, of a fluid pump mounted on the vehicle, a fluid motor carried on the outer end of the outwardly directed motor and connected with the saw shaft, a flexible conductor between the pump and the motor, a fluid reservoir mounted on the vehicle, a flexible conductor between said motor and the reservoir for conducting exhaust fluid from said motor to the reservoir, a conductor between the reservoir and the pump for supplying fluid to the pump from the reservoir, a second pump mounted on the vehicle and having a connection for drawing fluid from the reservoir, conductors connecting the second pump with the two fluid-actuated means for actuating the latter and adjusting the position of the outwardly directed member and the saw carried thereby without lowering the pressure on the fluid motor connected to the saw shaft, and valves in said latter conductors for controlling the operation of the fluid actuated means.

4. A mobile saw as set forth in claim 3, and a push bar carried by the tractor and extending laterally thereof above the saw.

JOHN C. JAQUES.